TRANSMITTING SYSTEM
Filed Sept. 30, 1966
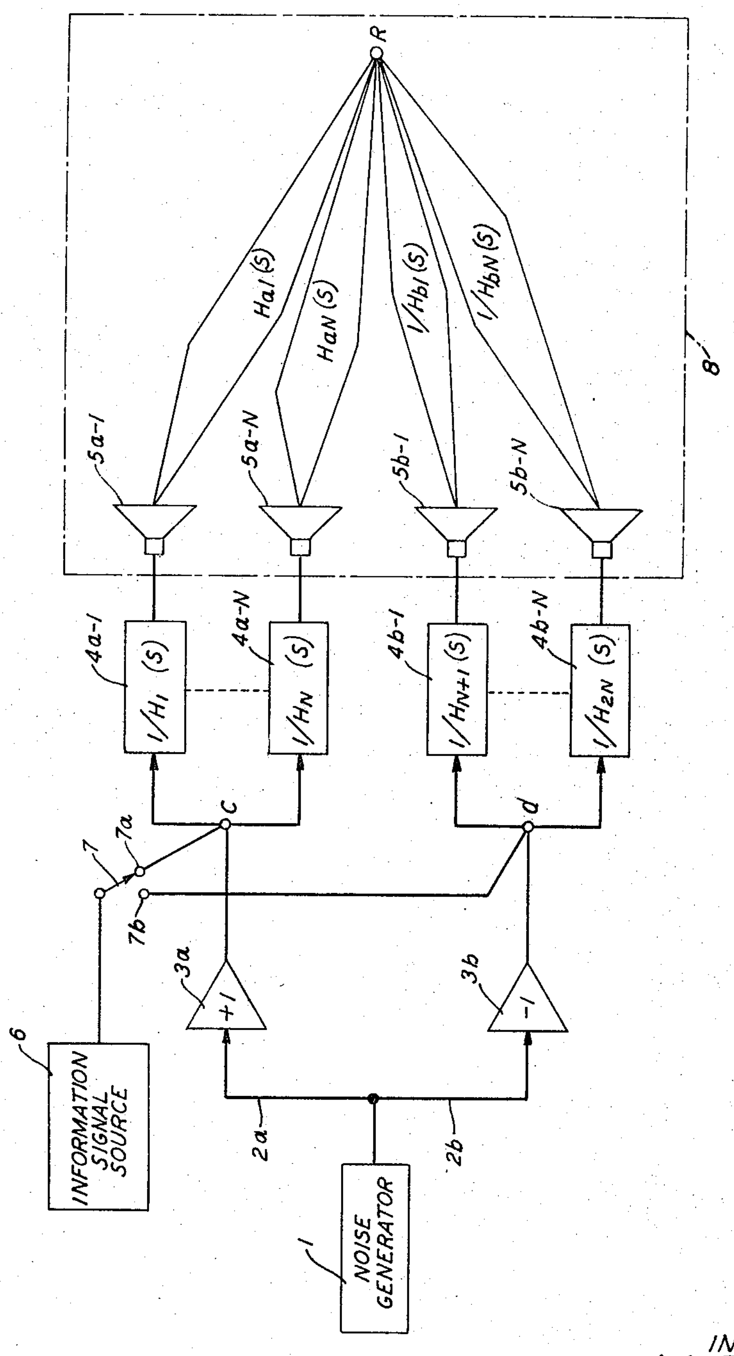
INVENTOR
J. L. FLANAGAN
BY
C. E. Hirsch Jr.
ATTORNEY 3,476,880

TRANSMITTING SYSTEM

James L. Flanagan, Warren Township, Somerset County, N.J., assignor to Bell Telephone Laboratories, Incorporated, Berkeley Heights, N.J., a corporation of New York Filed Sept. 30, 1966, Ser. No. 583,161
Int. Cl. H04m *1/70, 3/16*
U.S. Cl. 179—1.5 11 Claims

ABSTRACT OF THE DISCLOSURE

Acoustic message signals are transmitted exclusively to a selected point in an enclosed area, while at the same time producing masking noise at all other points in the area, by preconditioning a noise signal and delivering it in two different forms, for example, by way of two arrays of loud speakers or the like, to the selected point. With suitable processing, both normal and phase inverted replicas of the noise signal are produced at the selected point. These signals cancel at the point to produce a region of silence; at all other points in the area, however, there is no cancellation and noise is evident.

This invention relates to signal processing. In particular, this invention relates to the processing of acoustic noise signals prior to transmission so as to maintain a region of silence in a bounded reverberant volume while at the same time producing noise at all other points in the volume. For the purposes of this invention, noise is defined to include any signal, from white gaussian noise to music, capable of masking a selected information bearing signal.

As discussed in my copending application entiled "Signal Processor," Ser. No. 583,185 filed Sept. 30, 1966 and assigned to Bell Telephone Laboratories, Incorporated, now Patent 3,417,837 granted Dec. 24, 1968, sound produced in a bounded reverberant medium, such as a room or auditorium, often travels to a receiving element over a number of independent transmission paths. If the transmission medium is nondispersive, the receiving element detects a number of unsynchronized and unequally attenuated versions of the transmitted signal.

By placing a so-called frequency-inverse filter, of the type disclosed in the above cited patent, in series with the receiving element, the amplitude distortion introduced by the so-called multipath transmission channel is canceled and the phase distortion is compensated. The output signal from the filter-receiving element combination is thus a good replica of the transmitted signal.

Conversely, it is shown in the above cited patent that a good quality replica of a signal can be transmitted to a selected region, or "focal volume" in space by passing the signal to be transmitted through frequency-inverse filters with phase and amplitude characteristics inverse to those of the multipath transmission channels between the transmitting elements and the focal volume in space.

It is further shown that even when a multipath transmission channel is dispersive, a frequency-inverse filter can be synthesized to match its phase and amplitude characteristics, provided applicable stability criteria are met.

Now, sometimes it is desired to maintain silence in a selected region in a room while, at the same time, to produce noise at all other points in the room. Information, at a much lower amplitude than the noise, can then be transmitted to the selected region in the room unbeknown to people in other nearby regions. For example, in indoor sports arenas it is advantageous to be able to transmit oral instructions to selected sport participants without the knowledge of other participants.

Thus, an object of this invention is to maintain silence in a selected region or "focal volume" of a bounded reverberant volume while at the same time producing noise at all other points in the volume.

Another object is to transmit an information bearing signal to a selected focal volume in a bounded reverberant medium while, at the same time, masking the existence of this information bearing signal by noise at all other points in the medium.

These and other related objects are achieved by transmitting a carefully preconditioned noise signal through two parallel arrays of transmitting elements to the selected focal volume. The signal transmitted through one array is inverted in phase relative to the signal transmitted through the other array. Prior to transmission, the phase-inverted and the uninverted noise signals are passed through separate sets of parallel-connected filters corresponding on a one-to-one basis to the transmitting elements in the two transmitting arrays. Each filter has phase and amplitude characteristics inverse to those of the multipath transmission channel between its corresponding transmitting element and the focal volume at which it is desired to maintain silence. A filter which exhibits these characteristics is called a "frequency-inverse filter" in above-cited Patent 3,417,837; that nomenclature is adopted and used herein. The theory, construction, and use of such filters is discussed in detail in the cited patent. As a result of the action of the filters, both normal and phase inverted replicas of the noise are produced at the focal volume in space. Thus, these noise signals cancel, "producing" a region of silence. At all other points in the bounded reverberant volume, however, the noise signals fail to cancel, thus producing noise of varying intensity.

Once silence has been "produced" or maintained at the desired focal volume, an information bearing signal is transmitted through one of the two arrays of transmitting elements. A person in the focal volume hears the information bearing signal, while a person outside this focal volume does not, because of the noise.

This invention may be more fully understood from the following detailed description taken in conjunction with the single drawing.

As shown in the drawing, noise produced by generatro 1 is sent along leads 2*a* and 2*b* to unity gain amplifiers 3*a* and 3*b*. Amplifier 3*a* transmits unaltered the noise signal from generator 1, but amplifier 3*b* inverts the phase of this noise signal.

The noise signal passed by amplifier 3*a* is transmitted to the bank of filters 4*a*–1 through 4*a*–N, connected on a one-to-one basis to transmitting elements 5*a*–1 through 5*a*–N, where N is a positive integer. The phase inverted noise signal produced by amplifier 3*b* is transmitted to the bank of filters 4*b*–1 through 4*b*–N, connected on a one-to-one basis to transmitting elements 5*b*–1 through 5*b*–N. For the acoustic case, the transmitting elements may be loudspeakers located in a bounded reverberant medium 8, such as, a room or auditorium.

Each filter 4*a* has amplitude characteristics inverse to those of the multipath transmission channel between the corresponding transmitting element 5*a* and the focal volume R in medium 8 at which it is desired to maintain silence. The phase characteristics of each filter 4*a* compensate for the phase distortion of the transmission channel between element 5*a* and focal volume R. Thus, as shown in the above cited patent, if the frequency characteristics of the multipath transmission channel between a transmitting element and a selected focal volume in space are given by $H(s)$, the frequency characteristics of the filter must be given by $1/H(s) \cdot e^{-sT}$. The term T, which varies from filter to filter, as does $H(s)$, is an arbitrary delay time introduced to ensure synchronization of the signals transmitted from the several transmitting elements 5 to the focal volume R. Synchronization is necessary because, in general, the elements 5 are different distances from region R.

Filters *4b* likewise have amplitude characteristics inverse to those of the multipath transmission channels between their corresponding transmitting elements *5a* and the focal volume R. Again the phase characteristics of filters *4b* compensate for the phase distortion of the transmission channels between elements *5b* and R.

Filters with frequency characteristics proportional to $1/H(s)$ are described in detail in the above cited patent.

The signals transmitted by transmitting elements *5a*–1 through *5a*–N and *5b*–1 through *5b*–N arrive simultaneously at R. Because the noise transmitted by elements *5a* is inverted in phase relative to the noise transmitted by elements *5b*, silence is maintained in this region. At all other points in the bounded reverberant volume, noise of varying intensities is produced.

Of course, if other sources of acoustic energy exist in the bounded reverberant medium, energy from these sources will in general be present in region R.

An information bearing signal can be transmitted to focal volume R by connecting a signal source to one of the two arrays of transmitting elements, *5a*–1 through *5a*–N or *5b*–1 through *5b*–N. Thus, as shown in the drawing, signal source 6 is connected by means of two-position switch 7 through contact *7a*, junction *c* and filters *4a*–1 to *4a*–N to transmitting elements *5a*–1 through *5a*–N. Alternatively, by setting switch 7 on contact *7b*, source 6 is connected through filters *4b*–1 to *4b*–N to transmitting elements *5b*–1 through *5b*–N. Even though the amplitude of the information bearing message is made considerably lower than the amplitude of the noise signals, a person located in focal volume R is able to hear the transmitted message. However, people located outside focal volume R are unable to hear the message both because it is masked by the noise and because it has been focused on focal volume R by the pretransmission filtering.

Other embodiments of this invention will be obvious to those skilled in the signal processing arts in light of this disclosure. In particular, embodiments using electromagnetic signals rather than acoustic signals will be obvious to those skilled in the signal processing arts.

What is claimed is:

1. Apparatus which comprises:

a source of a noise signal, first means connected to said source for developing from said noise signal a first intermediate signal, second means connected to said source for developing from said noise signal a second intermediate signal inverted in phase relative to said first intermediate signal, a first set of transmitting elements positioned in a bounded reverberant medium, a second set of transmitting elements positioned in said medium, first means, connecting said first developing means to said first set of transmitting elements, for compensating for the phase and amplitude characteristics of the transmission channels between said first set of transmitting elements and a selected region in said bounded reverberant medium, and second means, connecting said second developing means to said second set of transmitting elements, for compensating for the phase and amplitude characteristics of the transmission channels between said second set of transmitting elements and said selected region.

2. Apparatus as defined in claim 1 in which said first signal developing means comprises a first unity-gain amplifier connected to said noise source, and in which said second signal developing means comprises a second unity-gain phase-inverting amplifier connected to said noise source.

3. Apparatus as defined in claim 2 in which said first compensating means comprises a first set of frequency-inverse filters connected to said first unity-gain amplifier and, on a one-to-one basis, to said first set of transmitting elements, each of said filters possessing amplitude and phase characteristics inverse to those of the transmission channel between said corresponding transmitting element and said selected region.

4. Apparatus as in claim 3 in which said second compensating means comprises a second set of frequency-inverse filters connected to said second unity-gain phase-inverting amplifier, and, on a one-to-one basis to said second set of transmitting elements, each of said filters possessing amplitude and phase characteristics inverse to those of the transmission channel between said corresponding transmitting element and said selected region.

5. Apparatus which comprises:

a noise generator, a unity-gain amplifier connected to said noise generator, a unity-gain phase-inverting amplifier connected to said noise generator, a first set of frequency-inverse filters connected to said unity-gain amplifier, a second set of frequency-inverse filters connected to said unity-gain phase-inverting amplifier, a first set of transmitting elements connected on a one-to-one basis to the filters in said first set, and a second set of transmitting elements connected on a one-to-one basis to the filters in said second set.

6. Apparatus which comprises:

a first source of a noise signal, a second source of an information signal, first means for transmitting said noise signal and said information signal to a selected focal volume in a bounded reverberant volume, and second means for transmitting a phase inverted replica of said noise signal to said focal volume, thereby to produce a replica of said information signal in said focal volume and noise at all other regions in said bounded reverberant volume.

7. Apparatus as in claim 6 in which said first transmitting means comprises:

a first set of transmitting elements, first means, connected to said first set of transmitting elements, for compensating for the phase and amplitude characteristics of the multipath transmission channels between said first set of transmitting elements and said focal volume, switching means for connecting said second source to said first compensating means, and a unity-gain amplifier connecting said first source to said first compensating means.

8. Apparatus as in claim 7 in which said second transmitting means comprises:

a second set of transmitting elements, second means, connected to said second set of transmitting elements, for compensating for the phase and amplitude characteristics of the multipath transmission channels between said second set of transmitting elements and said focal volume, and a unity-gain phase-inverting amplifier connecting said first source to said second compensating means.

9. Apparatus as in claim 8 in which said first compensating means comprise a first set of frequency-inverse filters connected to both said unity-gain amplifier and, through said switching means, to said second source, and connected on a one-to-one basis to said first set of transmitting elements, each of said filters possessing amplitude and phase characteristics inverse to those of the multipath transmission channel between its corresponding transmitting element and said selected focal volume.

10. Apparatus as in claim 9 in which said second compensating means comprise a second set of frequency-inverse filters connected to said unity-gain phase-inverting amplifier and on a one-to-one basis to said second set of transmitting elements, each of said filters possessing amplitude and phase characteristics inverse to those of the multipath transmission channel between its corresponding transmitting element and said selected focal volume.

11. Apparatus which comprises:

a first source of a noise signal, a second source of an information signal, first means for transmitting said noise signal to a selected focal volume in a bounded reverberant volume, and second means for transmitting said information signal and a phase inverted version of said noise signal to said focal volume, thereby to produce a replica of said information signal in said focal volume and noise at all other regions in said bounded reverberant volume.

References Cited

UNITED STATES PATENTS

| | | | |
|---|---|---|---|
| 2,792,493 | 5/1957 | Duckett et al. | 179—1.5 X |
| 3,164,676 | 1/1965 | Brunner. | |
| 3,170,991 | 2/1965 | Glasgal. | |
| 3,328,526 | 6/1967 | Schroeder | 179—1.5 |

RODNEY D. BENNETT, Jr., Primary Examiner

DANIEL C. KAUFMAN, Assistant Examiner

U.S. Cl. X.R.

181—0.5; 325—33